J. H. WAGENHORST.
WHEEL AND DEMOUNTABLE RIM THEREFOR.
APPLICATION FILED NOV. 5, 1917. RENEWED APR. 3, 1922.

1,435,269.

Patented Nov. 14, 1922.

2 SHEETS—SHEET 1.

Inventor
J. H. Wagenhorst
By Hull Smith Brock & West
Attys.

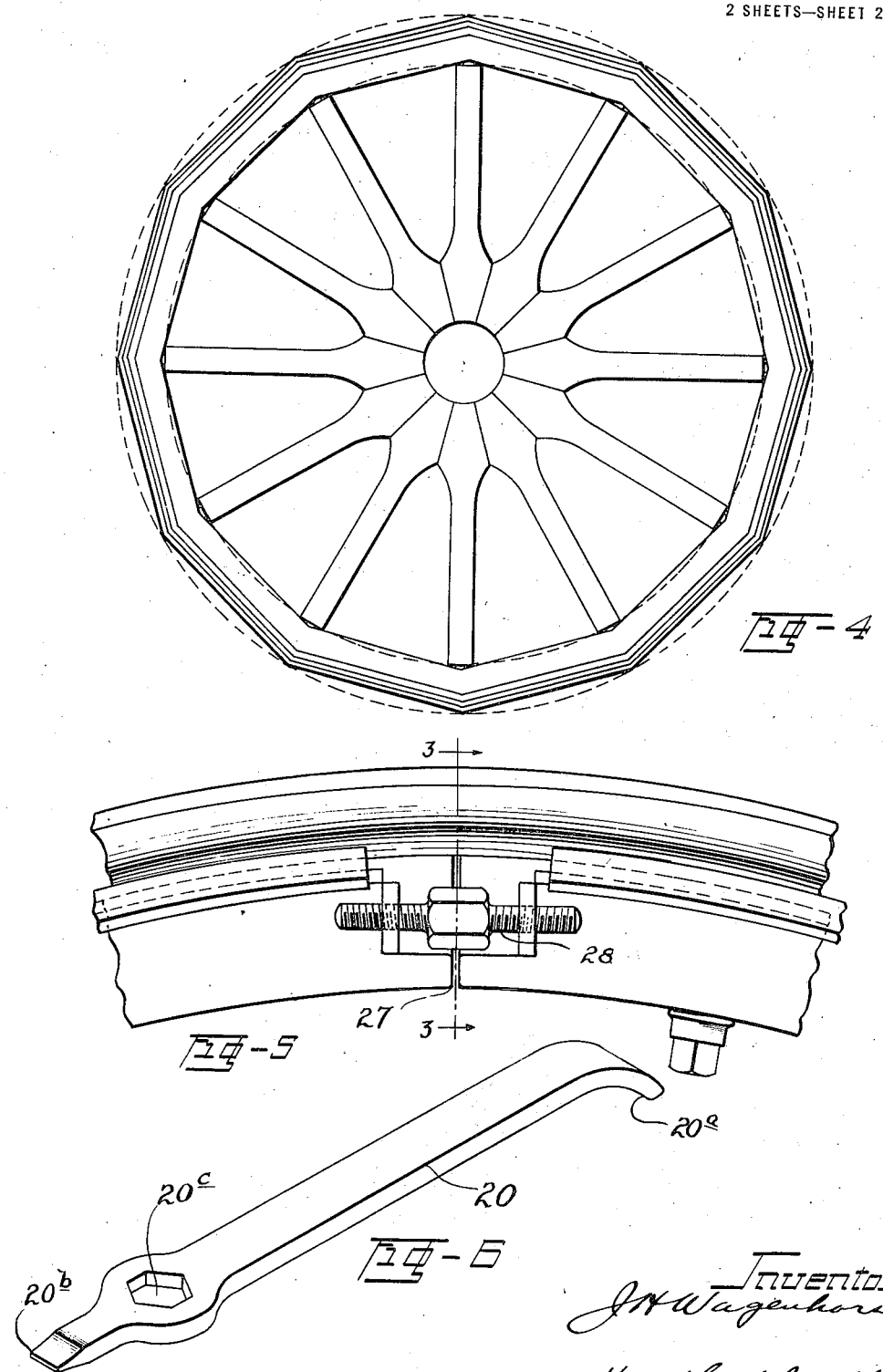

Patented Nov. 14, 1922.

1,435,269

UNITED STATES PATENT OFFICE.

JAMES H. WAGENHORST, OF AKRON, OHIO.

WHEEL AND DEMOUNTABLE RIM THEREFOR.

Application filed November 5, 1917, Serial No. 200,249. Renewed April 3, 1922. Serial No. 549,354.

*To all whom it may concern:*

Be it known that I, JAMES H. WAGENHORST, a citizen of the United States, residing at Akron, in the county of Summit and State of Ohio, have invented a certain new and useful Improvement in Wheels and Demountable Rims Therefor, of which the following is a full, clear, and exact description, reference being had to the accompanying drawings.

This invention relates generally to wheels and demountable rims therefor, together with means for fastening said demountable rims upon the wheel bodies.

The invention also comprehends the method of making the wheel body as well as the means for fastening the rims thereon.

The object of the invention is to provide an easily operated means for fastening a demountable tire carrying rim upon the wheel body, and a still further object is to provide a simple and efficient method of manufacturing the wheel body whereby the wheel body is properly tensioned and the spokes subjected to proper radial compression.

With these several objects in view the invention consists in the novel features of construction, combination or arrangement hereinafter fully described and pointed out in the claims.

Figure 1:
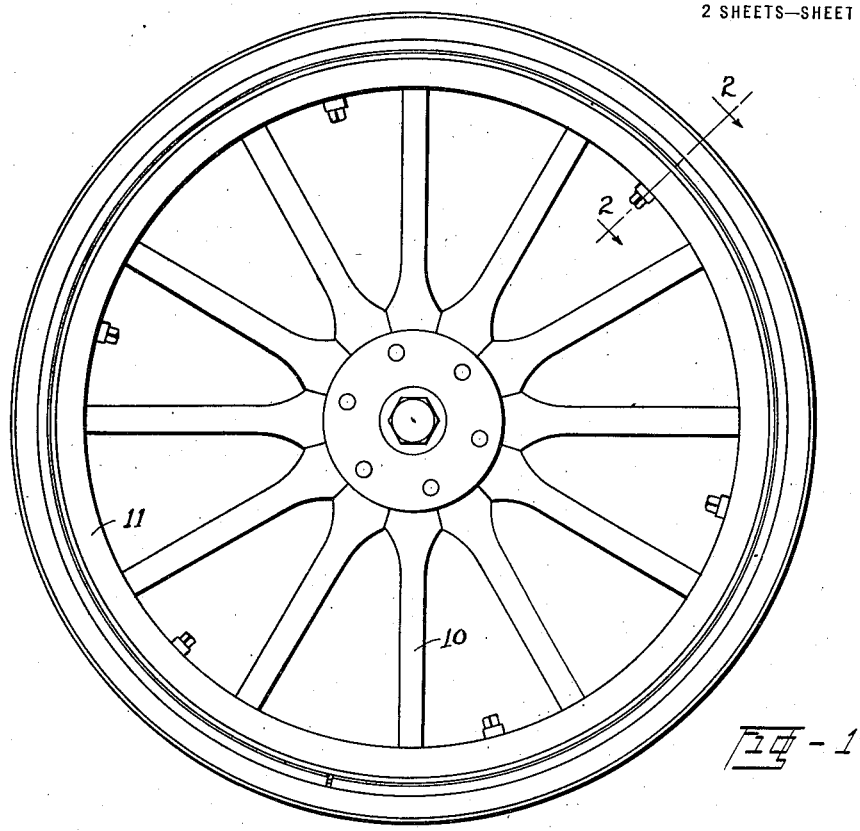
Figures 2, 3:
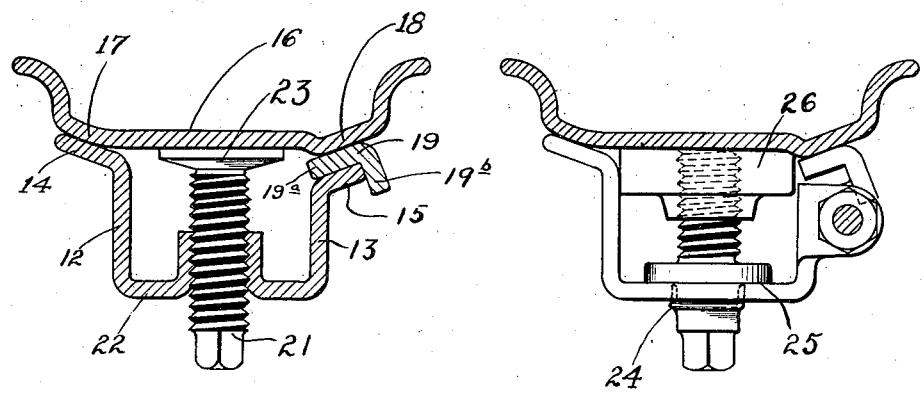

In the drawings forming a part of this specification Fig. 1 is a side view of a wheel with a demountable rim thereon, said wheel and rim being constructed in accordance with my invention; Fig. 2 is a sectional view on the line 2—2 of Fig. 1; Fig. 3 is a sectional view showing a slight modification; Fig. 4 is a view illustrating the method of making a wheel body in accordance with my invention; Fig. 5 is a detail view showing another means for fastening the demountable tire carrying rim upon the wheel body; Fig. 6 is a detail perspective view of the tool adapted for use in detaching the split fastening ring.

In carrying out my invention I employ a wheel body consisting of wooden spokes 10 and a continuous metallic fixed rim or felly 11. This metallic fixed rim is flanged as shown at 12 and 13, the flange 12 having its edge inclined outwardly as shown at 14 and the flange 13 has its flange inclined as shown at 15, and it will be noted that the flange 13 which is arranged upon the outer side of the wheel body is of less height than the flange 12. This permits the tire carrying rim 16 to be easily placed upon the wheel body inasmuch as the said rim will pass freely over the flange 13 of less height and the inner portion 17 of the rim will contact with and rest upon the flange 14 of the side 12 of the fixed rim while the portion 18 of the rim will rest opposite the flange 15 and inasmuch as the side 13 is of less height than the side 12 there will be an intervening space or clearance between the flanged edge 15 and the portion of the rim 18 and into this intervening space or clearance is inserted a split ring 19 which is preferably angular or L shape in cross-section as shown, the portion 19ª being inserted between the flange 15 and the inner face of the rim while the portion 19ᵇ is adapted to contact with the outer edge of the flange and serves as a stop for the ring, positioning the portion 19ª properly between the flange 15 and rim 16. The inwardly projecting end of the portion 19ᵇ also provides a point of engagement for the end 20ª of the tool 20 for the purpose of disengaging the ring from between the rim and felly when it is desired to remove the rim from the wheel. One end of said split ring being first disengaged and then the remaining portions stripped until the entire circular ring has been disengaged, the other end of the split ring being the last portion to be disengaged.

It will be noted that the portion 19ª of the ring 19 is inclined to the plane of the wheel body and it will be further noted that the faces of this inclined portion are parallel and consequently this portion does not and cannot serve in any sense as a wedge. As a matter of fact, the opposite faces of this ring are parallel conical surfaces, of frustums and the flange 15 is a similar surface and in the preferred construction the portion 18 of the rim is a similar surface, but it will be understood that this is not absolutely necessary as a locking ring such as herein shown and described can be used in connection with a commercial type of rim in which the opposite sides of the tire carrying rim are symmetrical. As previously stated the ring 19 is inserted between the rim and wheel body in order to take up the clearance between the flange 15 and the rim 16 and one end of this ring is first inserted and the remaining portions successively forced in between said flange and rim until the complete ring has been inserted and occupies the position shown in Fig. 2, the portion 19^b contacting with the edge of the felly flange and serving as a stop in properly positioning the inclined portion 19^a which serves as a filling ring but not a wedge. This ring, owing to its angular form and the positioning of the inclined portion 19^a upon the fixed rim 15 will prevent the ring being dislocated, except as previously described. After the split locking ring has been inserted between the rim and fixed rim flange the rim is tensioned in order to bind the locking ring securely between the fixed rim flange and said rim and various means for tensioning the rim may be provided, and in the drawings in Figs. 1 and 2 I have shown a radial bolt 21 screwed through a tubular portion 22 in the metal fixed rim which is punched from the bottom of the fixed rim outwardly and threaded as shown. The outer end of the bolt is also provided with a flat head 23 in order to have a broad area of contact with the rim.
It is obvious that by forcing the screws radially outward into contact with the rim, the rim will be tensioned, and at points between the radial bolts will be drawn down tightly upon the locking ring 19 and fixed rim flange 15. In Fig. 3 I have shown a slight modification in which the radial bolt 24 has a shoulder 25 which contacts with the fixed rim and prevents longitudinal movement of the bolt, and upon the threaded end of said bolt is a nut 26 which is caused to move outwardly in contact with the rim in order to tension and fasten the same as previously described.

In the construction shown in Figs. 1 and 2, a continuous fixed rim is shown but in Fig. 5 I have shown the wheel body split at one point, the ends being provided with outwardly projecting lugs 27 threaded for engagement with a turnbuckle 28 and by means of which the fixed rim can be expanded to fasten the rim upon the wheel and contracted whenever it is desired to release the rim from tension for the purpose of removing the same, and it will be understood that the split locking ring is employed in connection with the split or divided fixed rim exactly the same as already described and it will also be understood that radial bolts can be employed in connection with the split fixed rim or dispensed with as desired.

In the manufacture of the wheel body consisting of wooden spokes and continuous metallic fixed rim, various methods of producing a wheel may be employed and in Fig. 4 I have shown one method of making such wheel which consists in making the fixed rim polygonal in shape, there being as many angles as there are to be spokes in the wheel. The spokes are assembled with their tapered inner flanges together and are then inserted in the polygonal shape fixed rim, the outer end of each spoke resting in one of the angles of the fixed rim. The fixed rim is then, by any suitable means, shaped into a circle as true as it is possible to make the same commercially and by so doing each spoke is placed under radial compression and the fixed rim as a whole is tensioned so that a wheel body of exceptional strength and rigidity is provided.

It will thus be seen that I provide a novel construction of wheel body and also an exceedingly simple and efficient novel means for fastening a demountable tire carrying rim upon said wheel body, said fastening means being readily removable when desired to remove the tire and quickly and easily replaced and fastened for the purpose of securing the tire, said fastening means being of such a character that when once in place all danger of dislocation is completely avoided.

The ring in addition to serving as a spacing, supporting and locking means for the rim also serves to truly position said rim both laterally and concentrically upon the wheel body.

Having thus described my invention, what I claim is:—
1. The combination with a wheel body having rim supporting lands of different diameters, of a tire carrying rim arranged thereon, and a split ring angular in cross-section, one portion of said ring being adapted to be inserted between said rim and wheel body, the opposite faces of the portion so inserted being parallel and inclined to the plane of the wheel body.

2. The combination with a wheel body having lands of different diameters and a tire carrying rim and a split spacing ring interposed between the said rim and wheel body, the opposite faces of said ring being conical surfaces of parallel frusta.
3. In a device of the kind described, a truncated conical locking ring, the opposing faces thereof being parallel and a stop flange upon the outer edge of said locking ring.
4. In a device of the kind described, a transplit truncated conical locking ring having an annular stop flange upon the outer edge thereof, the opposing faces of the conical locking ring being parallel.
5. In a device of the kind described, a truncated conical locking ring having an integral stop flange, said ring and flange being arranged at an angle to each other, the opposing faces of said truncated conical ring being parallel, said ring and flange being divided at one point.

6. The combination with a wheel body having lands of different diameters, a tire carrying rim of a truncated conical spacing ring adapted to be inserted between said rim and wheel body, said truncated spacing ring having a stop flange, and means for tensioning said rim upon said wheel body and spacing ring.

7. The combination with a wheel body and demountable tire carrying rim, the said wheel body having lands of different diameters, of a truncated conical spacing ring adapted to be interposed between said wheel body and rim, the opposing faces of said ring being parallel and extending obliquely to the plane of the wheel body, and means for tensioning the rim and binding the same into locked engagement with the wheel body and ring.

8. The combination with a wheel body having rim supporting surfaces or lands of different diameters, the surface or land of less diameter being arranged at an oblique angle with reference to the plane of the wheel body, of a tire-carrying rim and a spacing ring adapted to be inserted between the contacting surface of said rim and the oblique supporting surface of the wheel body, said ring being so shaped as to rest at an oblique angle to the plane of the wheel when so inserted.

9. The combination with a wheel body having contacting surfaces of different diameters, the contacting surface of less diameter being arranged at an oblique angle with reference to the plane of the wheel body, the outer edge of said surface being of greatest diameter, of a demountable tire-carrying rim and an angled split ring adapted to be inserted between the supporting surface of less diameter and the adjacent contacting surface of said rim.

10. The combination with a wheel body having a fixed arm, the outer edges thereof extending obliquely in reverse directions, the outer flange of said fixed arm being of less diameter than the inner flange, of a tire-carrying rim and a split ring adapted to be inserted between the tire-carrying rim and the flange of less diameter, said ring being shaped to fill the intervening space and contact with both the rim and fixed rim.

11. The combination with a wheel body having a flanged fixed arm, the outer edges of said fixed arm being inclined in reverse directions, the outer flange of the fixed arm being of less diameter than the inner flange, of a tire-carrying rim and a split angled ring adapted to be inserted between the rim and flange of less diameter, one portion of said angled ring projecting toward the wheel center and adapted for engagement with a releasing tool.

12. The combination with a wheel body having a flanged fixed arm, the flanges thereof being of different diameters and having their outer edges inclined in reverse directions, the outer flange being of less diameter than the inner one, of a tire-carrying rim, a split ring adapted to be inserted between said rim and flange of less diameter and radial bolts for tensioning said rim.

In testimony whereof, I hereunto affix my signature.

JAMES H. WAGENHORST.